Oct. 1, 1940.  W. J. SCOTT  2,216,215
BELT SHIPPER MECHANISM
Filed March 22, 1940   2 Sheets-Sheet 1
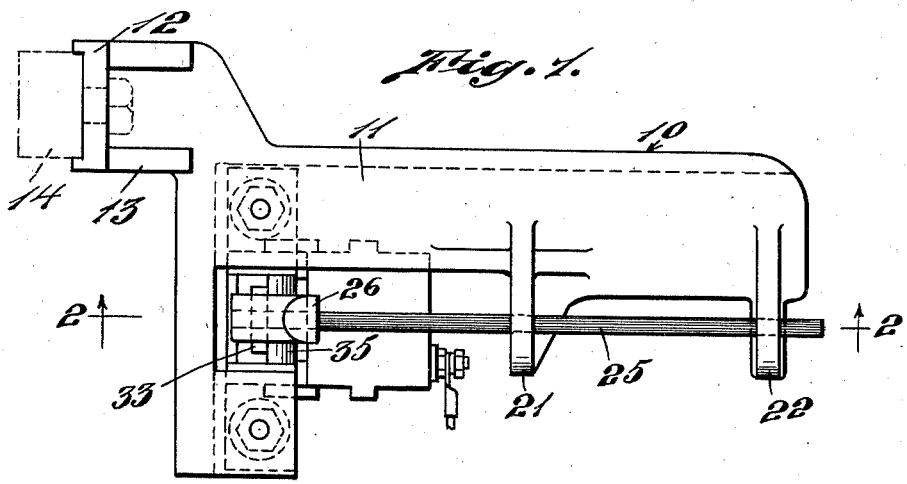
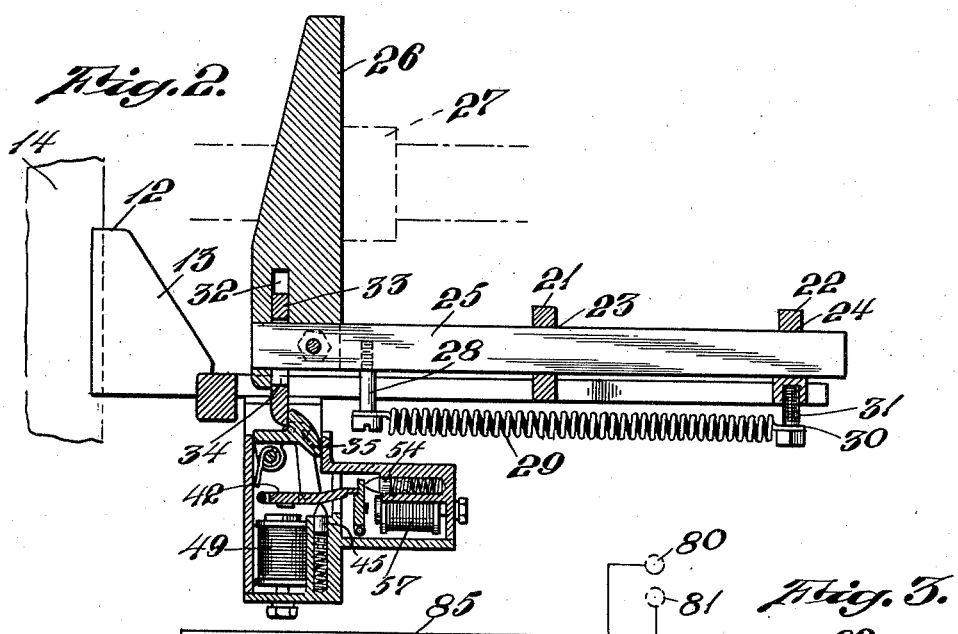
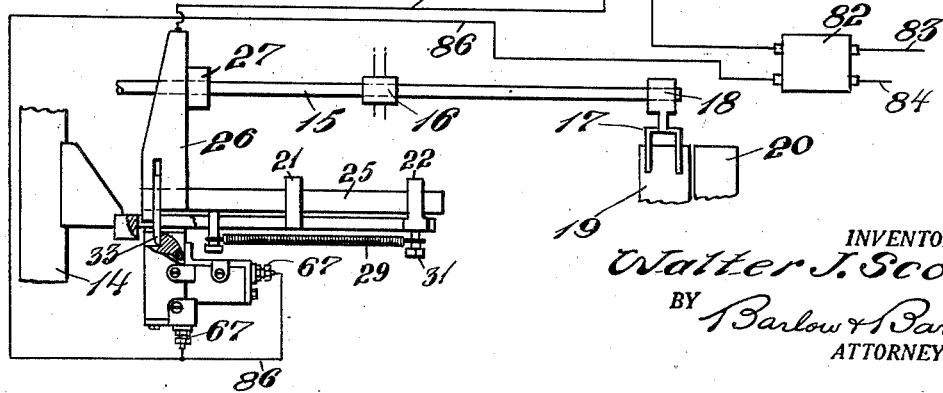
INVENTOR.
Walter J. Scott
BY Barlow & Barlow
ATTORNEYS.

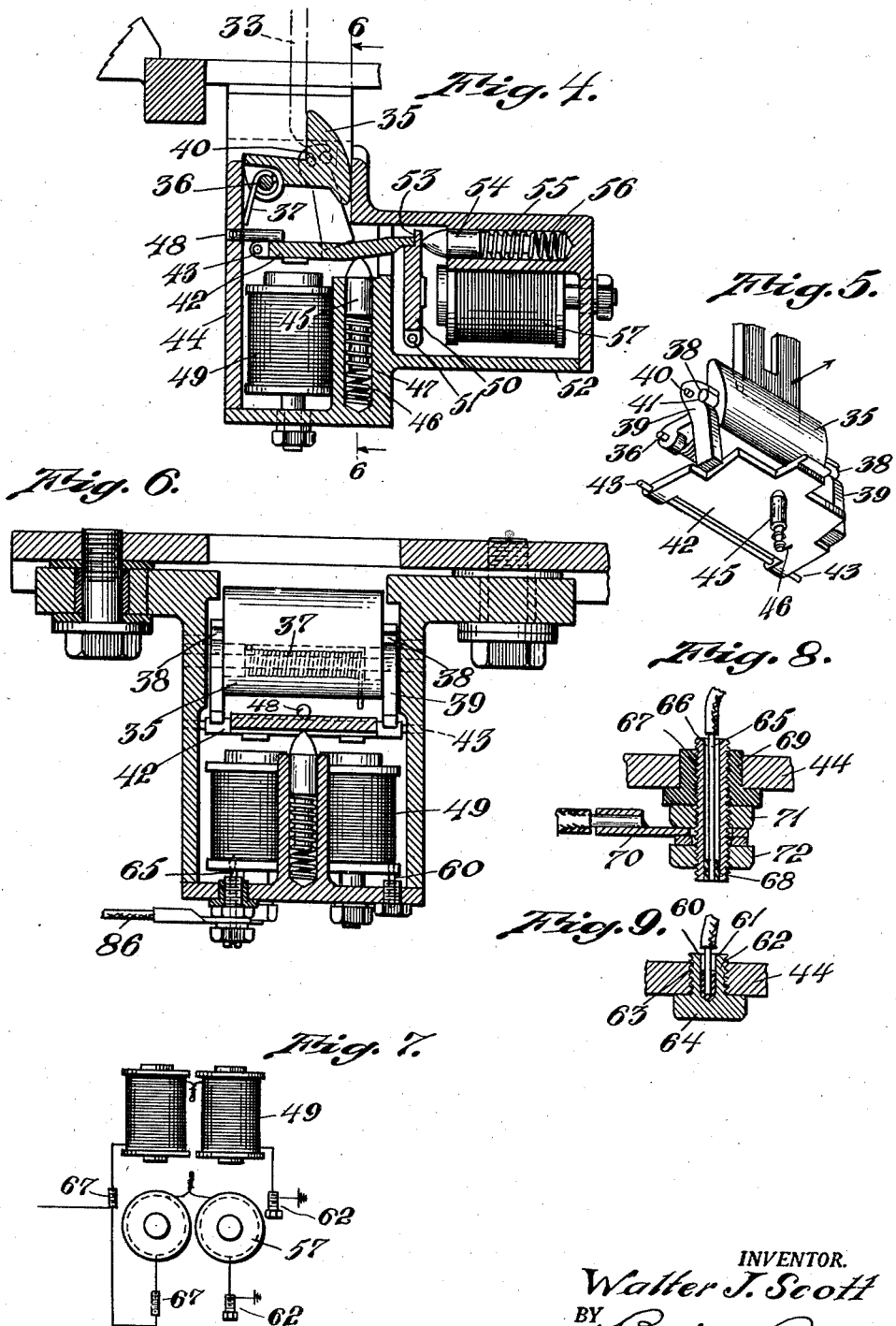

Patented Oct. 1, 1940

2,216,215

UNITED STATES PATENT OFFICE 2,216,215

BELT SHIPPER MECHANISM

Walter J. Scott, Woonsocket, R. I.

Application March 22, 1940, Serial No. 325,287

5 Claims. (Cl. 74—242.6)

This invention relates to a belt shipper mechanism of the type used for automatically shifting a belt for stopping the application of driving power to a machine or the like, upon the happening of some fault in the machine by reason of which work should be suspended until the fault is corrected, and is an improvement upon my prior invention set forth in Patent No. 1,937,207, dated November 28, 1933.

This invention has for one of its objects to provide a more secure locking arrangement than that previously provided and shown in the above patent so that regardless of vibration in the machine, the locking device cannot be shaken loose and will operate only upon the predetermined operation of means designed specifically for the stopping of the machine.

Another object of the invention is to provide an improved bracket and slide for the engagement of a shipper mechanism.

The invention is accomplished by means of a plurality of locks, one locking the other but capable of substantially simultaneous release for the operation of the shipper mechanism when desired.

The invention also utilizes electric coils for causing operation of the latches on the locks with these coils so arranged that they may be operated substantially simultaneously.

In carrying out the invention, the parts are so arranged that they may drop into position by gravity or else be urged into a predetermined position through springs.

With these and other objects in view, the invention consists of certain novel features of construction, as will be more fully described, and particularly pointed out in the appended claims.

In the accompanying drawings:

Fig. 1 is a top plan view of the bracket with my improved mechanism shown associated therewith;

Fig. 2 is a sectional view on line 2—2 of Fig. 1;

Fig. 3 is a side elevation on a smaller scale illustrating the shipper bar, the belt pulleys and the electric circuit for the operation of the shipper mechanism;

Fig. 4 is a sectional view of the latch mechanism in greater detail and on a larger scale than that shown in Fig. 2;

Fig. 5 is a perspective view of a portion of the latch mechanism;

Fig. 6 is a sectional view taken on substantially line 6—6 of Fig. 4;

Fig. 7 is a diagrammatic view showing the wiring hook-up for the two electromagnets utilized in this mechanism;

Fig. 8 is an enlarged detailed view of the means of connecting the wire of one end of the magnet to its terminal;

Fig. 9 is an enlarged view of the means of connecting the other end of the wire of the magnet to its terminal.

It is found in the utilization of a belt shipper mechanism such as shown in my prior patent, No. 1,937,207, that it sometimes occurs that vibration of the machine upon which it is mounted will shake the latching mechanism loose to permit operation of the belt shipper mechanism without the electrical energization of the magnet. In order to prevent this, I have utilized a second magnet which holds the armature of the first magnet in position, but which is so synchronized as to release at the same time that the catch which holds the shipper bar will be released and accordingly the belt shipper mechanism will be operated. In order to better perfect this mechanism, I have provided a bracket and slide bar for a more accurate movement of the latch which is released, whereby improved results may be obtained; and the following is a more detailed description of the present embodiment of this invention, illustrating the preferred means by which these advantageous results may be accomplished:

With reference to the drawings, 10 designates generally a bracket which consists of a body portion 11 with an arm 12 braced as at 13 to the body by which the bracket is mounted on some suitable upright support 14 to position the bracket in adjacency to the shipper bar 15 slidably mounted through a suitable hanger 16. The shipper bar carries the usual fork 17 mounted upon the bar through opening 18 to engage a belt which may be trained over the pulley 19 for driving the machine or which may be shifted to guide the belt onto the loose pulley 20 for idling of the machine which the belt drives.

A pair of guides 21 and 22 extend from the body 11 and are slotted as at 23 and 24 to slidably receive member 25 which carries the arm 26 for engaging an adjustable abutment 27 provided on the shipper bar 15. This member 25 is provided with a pin 28 to which one end of the spring 29 is attached, while the other end of the spring, 30, is anchored to a pin 31 in the portion 22 or any other fixed portion of the bracket. When the member 25 is moved into position to shift the belt to the tight pulley, the spring 29 is placed under tension, urging the member 25 to the right as shown in Figs. 1, 2, and 3 and thus tending to move the belt to the loose pulley.

The arm 26 is slotted as at 32 and in this slot a latch 33 is located which itself is slotted as at 34 to receive the member 25 and be guided by the member 25 in its vertical movement in the slot 32. This latch 33 may be pushed upwardly but will drop by gravity into a position to be engaged in order to hold the member 25 with its spring tensioned as illustrated in Figs. 1 and 2. If the latch is so positioned that gravity will not affect it, a spring will supply this force.

Referring more particularly to Fig. 4, the latch 33 is engaged by a catch 35 pivoted as at 36 and urged upwardly by a spring 37 which spring is much weaker than the spring 29. This catch 35 has oppositely outwardly extending trunnions 38 which are engaged by members 39 pivoted on pin 40 extending therefrom and recessed as at 41 to receive the trunnions 38, the surface of the recess being such that, while the members 39 are in the position illustrated in Figs. 4 and 5, the catch 35 cannot move downwardly and thus will lock with the latch to hold the member 25 in the position illustrated in Figs. 1 and 2. There are two of these members 39, one at either end of the catch 35. The trunnions 38 tend to move generally downwardly about the pivot 36 as a center and tend to swing the members 39 about their pivots 40. These members 39, however, are blocked against swinging about pivot pins 40 by the armature plate 42 pivoted by the pin 43 supported in the side walls of the casing 44. This armature plate is urged upwardly by the plunger 45 responding to the action of spring 46 in bore 47 in the casing 44. Such plate, however, is limited in its upward movement by the fixed pin 48 projecting inwardly from the side of the casing 44. An electromagnet 49 is positioned beneath the armature 42 and when energized will pull the armature 42 downwardly.

In order to prevent the armature 42 from being pulled downwardly, an armature 50 is provided extending generally at right angles thereto and pivoted as at 51 in the casing 52. This armature is notched as at 53 to receive the end of the armature 42. A plunger 54 tends to move the armature 50 into the position illustrated in Fig. 4 in response to the action of spring 55 in bore 56 of the casing 52. An electromagnet 57 will move the armature 50 toward it when energized so as to release the armature 42.

Winding of the armature 49 terminates in the wire end 60 which is received and soldered in the bore 61 of a post 62 threaded as at 63 into the casing 44 and having a head 64 engaging the casing so as to provide a ground for this end of the electromagnet. The other end of the wire of the electromagnet is designated generally 65 and extends into a bore 66 of a threaded post 67 to be soldered at the outer end of this post as at 68. This post extends through an insulating bushing 69 threaded into casing 44 which receives on its outer end some suitable terminal connection 70 bound between nuts 71 and 72 threaded onto its exterior surface.

The machine in connection with which this belt shipper is designed to operate will have two contacts which will be held separated when the machine is operated correctly and which will come together to complete a circuit when some fault in the machine occurs. The terminals 80 and 81 (see Fig. 3) will be connected to the separated contacts of the machine while a transformer 82 may be connected to either side of a line 83, 84 from a main supply of current. One of the lines to the belt shipper mechanism, 85, will be grounded, as indicated by its attachment to the bracket, while the other line 86 will extend to the live terminal post 67 of each of the electromagnets 29 and 57 (see Figs. 3 and 7). Thus, these electromagnets will be synchronized to operate in unison.

Upon bridging of the contacts connected to terminals 80 and 81, the circuit will be energized to cause electromagnet 57 to draw armature 50 toward it and also to move inwardly the plunger 54, thereby releasing the armature 42 which will be drawn downwardly by magnet 49 also moving the plunger 45, thereby releasing the member 39 which will be forced to the left as shown in Fig. 4 about its pivot 40 and catch 55 will be moved downwardly by the pull of the spring 29 on the latch 33 so that this latch will be released by the downward movement of the catch 35, thereby permitting spring 29 to move the member 25 to the right as shown in Fig. 2 and shift the belt in the fork 17 from the tight pulley 19 to the loose pulley 20.

The foregoing description is directed solely towards the construction illustrated, but I desire it to be understood that I reserve the privilege of resorting to all the mechanical changes to which the device is susceptible.

I claim:

1. In a belt shipper mechanism, means for urging the belt shipper in one direction, a latch part and a catch part, one of which parts is carried by said means for controlling movement of said means, electrically controlled locking means to block the other part from movement, a second electrically controlled locking means to control the movement of the first locking means, and means to synchronize the release of both locking means.

2. In a belt shipper mechanism, a bracket, a member slidable in the bracket, an arm on the member to engage the belt shipper bar, a spring for urging the slide member in one direction, a latch movable with said member, a catch to engage said latch and hold the member in a position with the spring tensioned sufficiently to move said member when the catch is released, means including an armature for locking said catch in latch-engaging position, an electromagnet for operating said armature, a second means including a second armature for holding said first armature in locking position, and a second electromagnet for operating said second armature.

3. In a belt shipper mechanism, a bracket, a member slidable in the bracket, an arm on the member to engage the belt shipper bar, a spring for urging the slide member in one direction, a latch movable with said member, a catch to engage the latch and hold the member in a position with the spring tensioned sufficiently to move said member when the catch is released, means including an armature and spring-pressed plunger for locking said catch in latch-engaging position, an electromagnet for operating said armature, means including a second armature and spring-pressed plunger for holding said first armature in locking position, and a second electromagnet for operating said second armature.

4. In a belt shipper mechanism, a bracket, a member slidable in the bracket, an arm on the member to engage the belt shipper bar, a spring for urging the slide member in one direction, a slot in said arm, a latch slidable in said slot and itself slotted to receive and be guided by said member, a catch to engage the latch and hold the member in a position with the spring tensioned sufficiently to move said member when the catch is released, means including an armature and spring-pressed plunger for locking said catch in latch-engaging position, and an electromagnet for operating said armature.

5. In a belt shipper mechanism, a bracket, a member slidable in the bracket, an arm on the member to engage the belt shipper bar, a spring for urging the slide member in one direction, a slot in said arm, a latch slidable in said slot and itself slotted to receive and be guided by said member, a catch to engage said latch and hold the member in a position with the spring tensioned sufficiently to move said member when the catch is released, means including an armature for locking said catch in latch-engaging position, and an electromagnet for operating said armature.

WALTER J. SCOTT.